United States Patent [19]
Cox

[11] Patent Number: 5,336,093
[45] Date of Patent: Aug. 9, 1994

[54] READING INSTRUCTIONS METHOD FOR DISABLED READERS

[76] Inventor: Carla H. Cox, 1607 Elwell Rd., Belleville, Mich. 48111

[21] Appl. No.: 20,599

[22] Filed: Feb. 22, 1993

[51] Int. Cl.⁵ .................................................. G09B 17/00
[52] U.S. Cl. .................................... 434/178; 434/184
[58] Field of Search ............... 434/178, 184, 167, 170, 434/172, 179, 185

[56] References Cited

U.S. PATENT DOCUMENTS

| | | |
|---|---|---|
| 146,631 | 1/1874 | Allen .............................. 434/178 X |
| 683,267 | 9/1901 | Froehlich ...................... 434/170 X |
| 3,611,593 | 10/1971 | Shapiro . |
| 4,490,118 | 12/1984 | Stewart .............................. 434/178 |
| 4,609,357 | 9/1986 | Clegg .................................. 434/167 |
| 4,643,450 | 2/1987 | Morris ................................ 283/46 |
| 4,655,713 | 4/1987 | Weiss .................................. 434/178 |

Primary Examiner—Gene Mancene
Assistant Examiner—Jeffrey A. Smith
Attorney, Agent, or Firm—Brooks & Kushman

[57] ABSTRACT

A method for instructing and aiding disabled readers by dividing multi-syllabic words in a passage into their single syllable components and placing a dot above the vowel, vowel diphthong, or vowel digraph which contributes to the distinctive sound of that syllable. Word division is accomplished by placing an extra half-space between the letters of adjacent syllables to prevent confusion between syllables and separate words. This method can be supplemented or reinforced by the use of audio tapes and text material without the divisions and markings.

5 Claims, 2 Drawing Sheets

A Bird of Extinction

One hundred and seventy-five years ago, passenger pigeons were common all over eastern North America. They roosted together in great colonies and flew together in huge flocks. Often the sun would be hidden from view for an hour at a time, while massive flocks flew across the sky.

What has happened to the passenger pigeon? This bird is no longer in existence anywhere in the world. It has become an extinct species.

There are a variety of reasons why the passenger pigeon population no longer exists. However, the main cause can be attributed to needless overhunting and greed. A hundred or more nesting pigeons and squabs could be caught out of one large tree alone, while others could be shot during flight or feeding. Due to their large numbers, the passenger pigeons were considered easy targets.

The last passenger pigeon, named Matilda, had been born and raised in captivity at the Cincinnati Zoo. Despite countless efforts to revive the species through Matilda, all mating attempts proved unsuccessful. In 1914, Matilda died. She was twenty-six years old.

FIG. 1

READING INSTRUCTIONS METHOD FOR DISABLED READERS

TECHNICAL FIELD

This invention relates to a reading instruction method for dyslexic or disabled readers and, more specifically, to a method of reading instruction which incorporates separation of multi-syllabic words into their component syllabic parts, combined with identification of distinctive vowel sounds within each syllable.

BACKGROUND ART

In the past fifty years, the high incidence of illiteracy in schools and the overall inadequacy of reading performance on standardized tests has prompted additional funding by both the federal and state governments for helping children who possess severe reading disabilities in the United States. Research studies by the U.S. Office of Education, research groups, and others estimate that more than twenty million students suffer from dyslexia and related reading disorders. Dyslexia is most commonly defined as a severe reading disability based on neuropsychological immaturity or dysfunction which interferes with the integration of perceptual and linguistic symbols. While not all disabled readers qualify as being dyslexic by this definition, the incidence of severe reading disabilities is common in most U.S. schools today.

One problem that many dyslexics and other disabled readers commonly experience is the inability to decode unfamiliar words. The abstract nature of alphabetic systems imposes large demands on individuals learning to read. In comparison to other languages, where pictures or written symbols correspond to specific ideas or concepts, alphabetic systems have letters, or graphemes, which have no meaning themselves. Instead, the letters represent speech sounds, or phonemes, which possess meaning only when blended together. As a result, the reading process becomes slower, less accurate, less fluent, and more stressful for the reader. Repeated unsuccessful decoding attempts may directly affect the level of comprehension as well.

The reading process for disabled readers is a difficult task since it involves the processing and integration of both visual and auditory information or stimuli. Many disabled readers are able to recall, by name, the majority of letters in the alphabet, but become confused when sounds are assigned to these letters. In the English alphabet, an individual letter is not assigned to consistently represent one distinct vowel sound. The letter "a", for example, can represent a variety of sounds (i.e., "cat", "cake", "call", "card"). Due to these inherent inconsistencies in the spelling and pronunciation of the English language, most disabled readers disregard the auditory processing component, and tend to rely solely upon the visual stimuli. In effect, they learn to visually memorize as many words as possible.

Even though many disabled readers are able to function at a low level by memorizing a number of high frequency words, the problem of decoding unfamiliar, multi-syllabic words still remains a barrier. For most disabled readers, the goal of ever reading a newspaper will never become a reality unless effective intervention occurs.

Several methods have been devised to help disabled readers learn unfamiliar words. U.S. Pat. No. 146,631 to Allen describes a technique for indicating the syllables of a word by placing a mark under or over the final letter of each syllable. Accented syllables are indicated in the word by using a mark which is different than the syllabication mark. This method, however, is confusing because the separation of syllables is not made visually clear to the reader. Additionally, no effort is made to mark or indicate the location of vowels within the syllables.

Another reading instruction method is described in U.S. Pat. No. 4,655,713 to Weiss. In this method, letters which initiate a distinctive sound are contrasted within the word by a difference in color, intensity, or type style. The letters which have no distinctive sound are marked with non-pictorial, short stroke symbols or superscript letters to indicate their proper pronunciation. Syllables may be denoted by a small dot inserted in between letters without providing additional spacing. This method is quite complicated because the reader must memorize new symbols, as well as their associated sounds, in addition to the regular alphabet. The reader may also become excessively dependent on the short stroke symbols for proper pronunciation, making the transition to normal reading materials difficult.

U.S. Pat. No. 4,490,118 to Stewart discloses a syllable pattern recognition method which classifies syllables in the English language into six different vowel and consonant combinations. These vowel-consonant combinations are printed on separate cards. During instruction, a multi-syllabic word is divided into syllables with each syllable printed on a separate card. The student is instructed to look at each syllable of the word and select the card which corresponds in letter pattern with the syllable of that word. This method, however, is not easily adaptable for use in printed text or private study.

DISCLOSURE OF THE INVENTION

It is therefore an object of the present invention to provide a reading instruction method which does not require memorization of extra symbols that may cause confusion to the reader.

Another object of the invention is to provide a reading instruction method which is adaptable for use in printed text and can be easily modified from an instructional reading environment to a normal reading environment.

It is another object of the invention to provide a reading instruction method which gives a disabled reader both visual and auditory stimulus to aid in the integration of the visual and auditory reading components.

Yet another object of the invention is to provide a reading instruction method which minimizes extraneous visual distractions for the disabled reader.

In carrying out the above objects and other objects, features and advantages of the invention, a method for instructing disabled readers combines visual separation of component syllables with an indication of a single vowel, vowel diphthong, or vowel digraph in each syllable which initiate the syllable's vowel sound. The syllables in each word are separated by a half-space to distinguish from the full space separation between the words themselves. A dot is printed above the vowel combination in each syllable which contributes to its distinctive sound. The term "vowel combination" in the specification is defined to include single vowels, vowel diphthongs, and vowel digraphs.

In a preferred embodiment, a passage is printed on the left page of a text using the spacing and marking method of the invention. A second copy of the same passage is printed on the facing page without the additional spaces and dots, simulating normal printed text. The second copy enables the reader to practice his or her reading ability without assistance from the visual prompts. An audio recording of the passage may also be provided to give the reader immediate auditory reinforcement.

BRIEF DESCRIPTION OF THE DRAWINGS

FIG. 1 illustrates printed text using the method of the invention;

BEST MODE FOR CARRYING OUT THE INVENTION

Figure 2:
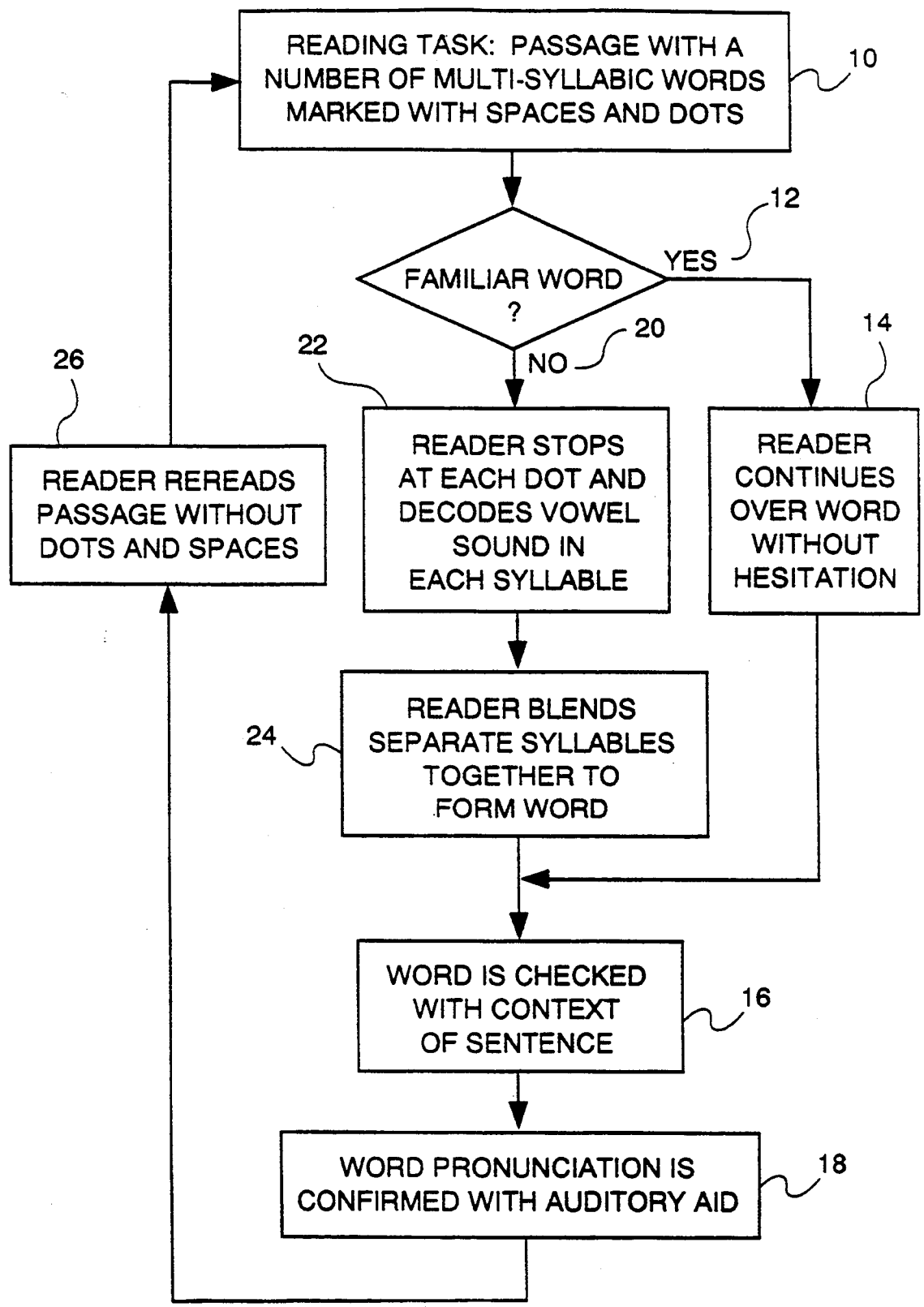
FIG. 2 is a flow chart illustrating the learning process using the method.

Referring to FIG. 1, a passage having a number of multi-syllabic words is printed according to the method of the present invention. Each multi-syllabic word in the passage is divided into its component syllables by inserting a half-space in between the letters of adjacent syllables. This syllabic division may also be referred to as "phonological segmentation." This space size between syllables is smaller than the space size between words, enabling a reader to easily visualize the separate syllable components without mistaking the syllables for actual words.

Each multi-syllabic word has, in addition to the extra spaces, one or more dots printed above it. One dot is placed above each vowel combination which contributes to the distinctive vowel sound of the syllable.

FIG. 2 shows the general steps of the method in detail to illustrate the learning process using the method of the present invention. In the method, a reader uses a sight recognition approach to read and decode each multi-syllabic word in the passage 10. The reader is instructed to glide his or her thumb above the words as he or she reads them. When the reader encounters a familiar word 12, the reader scans the word without hesitating at the dots and spaces 14, leaving his or her internal automatic memory processing retrieval system intact. Additionally, the correct pronunciation of the word correlates with the context of the sentence surrounding it 16. At this point, the reader may choose to play an audio tape 18 to double-check word accuracy.

When the reader is unsuccessful in decoding an unfamiliar multi-syllabic word 20 through sight recognition, the reader may be experiencing internal memory processing difficulties which result in incomplete or incorrect word retrieval. At this point, the reader needs to use phonological segmentation to decode the word, but most disabled readers are unable to separate multi-syllabic words into smaller segments. Dots printed above the vowel sounds according to the invention help the reader identify the specific audible vowel sounds in the word, minimizing confusion. Additionally, the half-space between the syllables in the word eliminates the need for the reader to concentrate on how to divide the word, decreasing the time necessary to complete the passage.

Preferably, the reader is instructed to stop his or her thumb above each printed dot 22 while simultaneously reading and decoding each syllable in the unfamiliar, multi-syllabic word. After all of the separate audible vowel sounds have been read, the reader then blends together the individual syllables 24 in order to formulate the correct pronunciation of the unfamiliar word. Once the reader has determined the correct pronunciation of the word, he or she checks to make sure that the word correlates with the context of the sentence 16.

After the reader reads the passage with the aid of the printed dots and extra spaces in between syllables, the reader may choose to read the same passage without the visual prompts 26. The same passage may also be reprinted on the facing page without any extra spaces or dots, simulating normal printed text material. This extra step enables the reader to adapt from the instructional reading environment of the method to a normal reading environment. Since the normal text is not radically modified by the invention to create instructional text, this transition is not very difficult for the reader to make. Additionally, the audio tape may also be used 18 at this point to provide the reader immediate reinforcement and also to confirm the correct pronunciation of each word.

While the best mode for carrying out the invention has been described in detail, those familiar with the art to which this invention relates will recognize various alternative designs and embodiments for practicing the invention as defined by the following claims.

What is claimed is:

1. A reading instruction method for teaching reading skills comprising:
   providing multi-syllabic words in text form which are divided into single syllable components by placing a half space between the letters of adjacent syllables wherein each syllable has a vowel combination which contributes to the distinctive vowel sound of the syllable;
   providing in the text a dot above the vowel combination in each syllable which contributes to the distinctive vowel sound of the syllable; and
   instructing a student to read multi-syllabic words which have been divided into single syllable components by decoding each syllable in any unfamiliar multi-syllabic word by reading the distinctive vowel sound of the vowel combination marked by a dot.

2. The method of claim 1 further comprising the step of providing a second text duplicating the text without the spaces and the dots in the form of normal text material, and instructing the reader to read the second text.

3. The method of claim 1 further comprising the step of providing an auditory recording of the text to the reader to confirm the correct pronunciation of the words, and instructing the reader to listen to the auditory recording of the text.

4. A reading instruction method for teaching reading skills to a disabled reader in decoding multi-syllabic words wherein each syllable has a vowel combination which contributes to the distinctive vowel sound of the syllable, the method comprising:
   providing a first text wherein multi-syllabic words are divided into single syllable components by placing a half space between the letters of adjacent syllables;
   providing in the text a mark indicating a vowel combination in each syllable which contributes to the distinctive vowel sound of the syllable;
   providing a second text corresponding to the first text with the words reprinted without the spaces and the dots;

providing an auditory recording of the text to the reader to confirm the correct pronunciation of the words; and instructing the reader to read the text by decoding each syllable of any multi-syllabic word which is unfamiliar by first reading the distinctive vowel sound of the marked vowel combination;

instructing the reader to read the second text; and instructing the reader to listen to the auditory recording of the text.

5. A method of making a device for teaching reading skills, the method comprising:

providing text wherein the words are divided into single syllable components by placing a half space between the letters of adjacent syllables, each syllable having a vowel combination which contributes to the distinctive vowel sound of the syllable; and marking the vowel combination in each syllable which contributes to the distinctive vowel sound of the syllable by placing a mark above the vowel combination.

* * * * *